May 13, 1924.
C. C. FOWLER
1,493,623
PROCESS OF TREATING SACCHARIDES
Filed May 31, 1921
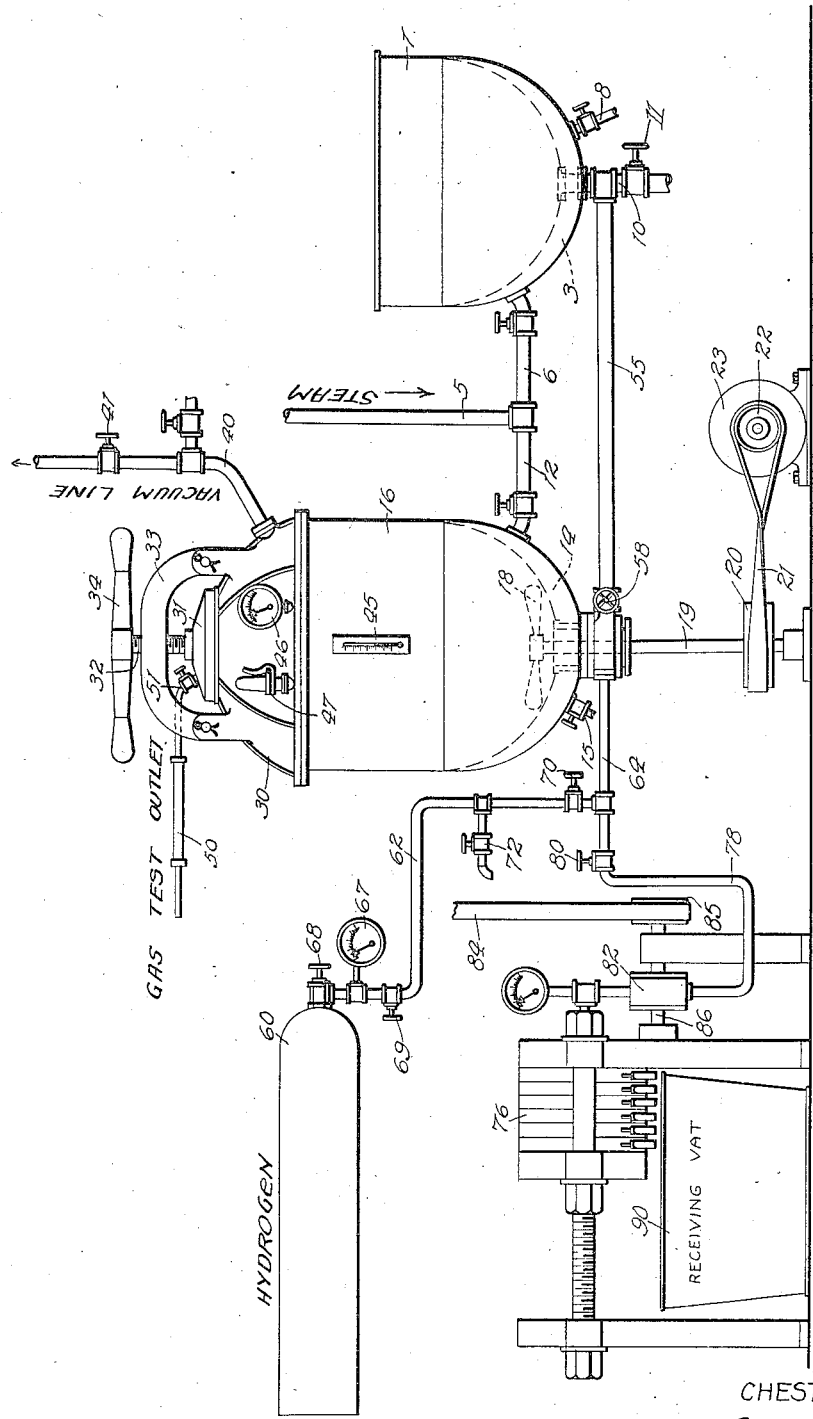
Inventor
CHESTER C. FOWLER
By Reed & Rogers Attys Patented May 13, 1924.

1,493,623

UNITED STATES PATENT OFFICE.

CHESTER C. FOWLER, OF CHICAGO, ILLINOIS, ASSIGNOR TO NATIONAL CANDY COMPANY, OF ST. LOUIS, MISSOURI, A CORPORATION OF NEW JERSEY.

PROCESS OF TREATING SACCHARIDES.

Application filed May 31, 1921. Serial No. 473,783.

*To all whom it may concern:*

Be it known that I, CHESTER C. FOWLER, a citizen of the United States, residing at Chicago, Cook County, Illinois, have invented a new and a useful Process of Treating Saccharides, of which the following is a specification.

This invention relates to a process of treating saccharides, especially cane sugar, corn syrup and the like, and has for its object to improve the taste and odor of the substance. Generally speaking, the process consists in subjecting the substance in the form of a solution to the action of hydrogen and a catalyzer in the presence of heat, and, preferably, also of a moderate degree of pressure. In treating corn syrup or similar syrups the process increases the sweetness without otherwise producing a greatly marked result. In treating cane sugar, however, the result is marked, for not only is the sweetness increased, but the flavor and odor also are improved. The product acquires a sweetness which is characteristic and pleasant, and somewhat resembling a maple flavor.

To explain the process in greater detail, attention is called to the accompanying drawing which represents, to a certain extent in a diagrammatic manner, apparatus by which my process may be advantageously carried out.

In this apparatus a mixing kettle 1 is provided having a steam chamber 3 at the bottom for keeping the contents heated during the mixing process. Steam is supplied to this chamber from a supply pipe 5 and branch 6. A drain cock 8 is provided at the bottom of the chamber through which the condensed steam may be drawn off from time to time. The mixing chamber may be filled through the top and the contents may be drawn off from the bottom either through a drain pipe 10 having a valve 11, or through a pipe 55 hereinafter described. The steam line 5 also has a branch 12 which leads to a chamber 14 formed in the bottom of the treating chamber or autoclave 16. This autoclave, which for convenience is usually referred to as a "tank" is provided with a rotary paddle or other agitating mechanism 18, driven by a shaft 19 passing up through the bottom of the tank and driven by any suitable power device. In the present case shaft 19 has a pulley 20 connected by a belt 21 to the pulley 22 of an electric motor 23. A drain cock 15 is provided through which the condensation may be drawn off from chamber 14.

At the top the tank has a dome 30 provided with a cover 31 clamped down by a screw 32 working in a yoke 33 and having a lever or hand wheel 34 by which the cover may be tightly closed. Leading out of the tank from the dome 30 is a vacuum line 40 by which the gaseous contents of the tank may be removed. This line is provided with a suitable shut-off valve 41. By preference the vacuum line 40 leads to some place outside of the building, as it is apt to convey at times a certain amount of hydrogen which is highly inflammable in the air and consequently should be promptly dissipated. It is desirable to provide the tank with a thermometer 45, pressure gauge 46 and safety valve 47. In order that the gas within the tank may be tested, it is desirable to provide a gas test outlet 50 controlled by a shut-off valve 51.

Connected to the outlet 10 of the mixing kettle 1 is a pipe 55 which communicates with the bottom of tank 16 to afford ready means by which the contents of the kettle may be transferred to the tank after the preliminary mixing action is complete. The flow through pipe 55 is controlled by a shut-off valve 58. The hydrogen used during the process is supplied from any suitable source, for example, the tube 60 which has a hydrogen line 62 leading from it to a pipe 64 which communicates with the inside of tank 16, the result being that when the line is open the hydrogen may flow from the tube into the tank. It is desirable to provide the hydrogen tube with a pressure gauge 67 and suitable control valves 68, 69 and 70, and a drain 72. Pipe 64 also affords means for conveying the treated syrup to a filter press 76 through a pipe line 78 furnished with a valve 80 and a pressure pump 82. Said pump is driven by any suitable means, for example, a belt 84 driving a pulley 85 fastened to the pump shaft 86. The filtered solution passes from the filter into a suitable receiving tank 90. As filter presses are well known, detailed description is unnecessary.

I will now describe a typical example as to how the process may be practiced, especially as relating to cane sugar:

I first produce in the mixing kettle 1, a mixture of sugar, water and a catalyzer. A suitable catalyzer is catalytic nickel or nickel reduced to a fine state of subdivision, and this is usually diffused through a mass of powdered diatomaceous earth or kieselguhr. A suitable proportion is 200 pounds of sugar, 100 pounds of water, and an amount of catalyzer containing about 40 grams of catalytic nickel. Other catalyzers, however, may be substituted with like effect. After the sugar, water and catalyzer have been thoroughly mixed the tank 16 is closed, as are also the valves 70 and 80. Valve 41 is then opened, which produces a partial vacuum in the tank and causes the contents of the kettle to flow through pipe 55 into the tank. The valve 58 is then closed. The next step is to substitute for an atmosphere of air in the autoclave tank an atmosphere of hydrogen. This is done by evacuating the air by opening valve 41 in the vacuum line and withdrawing the air to as great a degree as practicable. Valve 41 is then closed and the valves 68, 69 and 70 opened so as to permit hydrogen from tube 60 to flow into the autoclave tank. A small amount of gas is allowed to flow out of the gas test outlet 50, and is tested to determine whether any appreciable amount of air remains in the autoclave tank. When the air has been excluded, valve 51 is closed, and the hydrogen pressure is allowed to increase to the desired degree. Judging from many tests I believe that the degree of pressure of the hydrogen within the tank is not of great, if any, importance although I usually practice the process with a gauge pressure of about 60 pounds.

When the proper amount of hydrogen has flowed into the tank the valves 68 and 70 are closed, thus confining the hydrogen within the tank. The tank now being charged, steam is turned on into chamber 14 from the steam line 5, 12 and the mechanical mixing element 18 is started rotating. It will be observed that the solution within the tank is now subjected to the action of heat and mechanical mixing in the presence of hydrogen and a catalyzer, and a moderate degree of pressure, although as I have stated, the degree of pressure seems to be an immaterial factor. These conditions are maintained for a considerable period. The optimum change seems to take place at from 220 to 230 degrees Fahrenheit when the contents are subjected to about 60 pounds pressure for a period of about four hours. Under these conditions the boiling point of the mixture is not reached. A longer duration, for example, 6 to 8 hours produces little if any additional change. Below a temperature of 220 degrees the change goes on more slowly, and the characteristic properties are not as strongly developed. If the temperature is maintained for any considerable time above 230 degrees a certain amount of caramelization is apt to result.

After the solution has thus been treated in the tank it is removed and filtered. This may be done with the illustrated apparatus by opening the valve 80 and starting the pump 82 and thus forcing the solution through the filter press 76 and out into the receiving tank 90.

As above stated, the product resulting from this process has a characteristic pleasant taste and odor. Furthermore, the sweetness is increased, and the taste somewhat resembles that of maple syrup.

Corn syrup may be treated in a similar manner, although the characteristics of the resulting product are not so pronounced, the chief observable change being an increased sweetness.

Having thus described my invention, what I claim as new and desire to secure by Letters Patent is:

1. The process of treating saccharides which consists of mixing the substance with water and nickel in proper form to serve as a catalyzer, agitating the solution in the presence of hydrogen under pressure and at the same time heating it to a temperature ranging between 220° and 230° F. with exclusion of air for a period of approximately four hours.

2. The process of treating cane sugar which consists in mixing with a given amount of sugar about half its weight of water and nickel in proper form to serve as a catalyzer; heating and agitating the solution in the presence of hydrogen under pressure with exclusion of air, and filtering the resulting solution to remove the catalyzer.

In witness whereof, I have hereunto subscribed my name.

CHESTER C. FOWLER.